United States Patent Office
3,730,865
Patented May 1, 1973

3,730,865
ELECTRODEPOSITION OF A COMPOSITION CONTAINING AN ESTER RESIN AND A METHYLOLPHENOL ETHER
Erwin J. Kapalko and William H. English, Delaware, Ohio, assignors to PPG Industries, Inc., Pittsburgh, Pa.
No Drawing. Continuation of abandoned application Ser. No. 748,953, July 31, 1968. This application Aug. 12, 1971, Ser. No. 171,380
Int. Cl. B01k 5/02; C23b 13/00
U.S. Cl. 204—181                           7 Claims

ABSTRACT OF THE DISCLOSURE

Electrodepositable coating compositions having outstanding detergent resistance and other improved properties are provided by a combination of a vehicle resin which is a mixed partial ester of a resinous polyol containing free carboxyl groups, said polyol having a portion of its hydroxyl groups esterified with fatty acid and at least a portion of the remaining hydroxyl groups esterified with an unsaturated fatty acid alpha, beta-ethylenically unsaturated carboxylic acid anhydride adduct, said adduct forming the ester, then the anhydride ring of the adduct; and a methylolphenol ether composition of the formula:

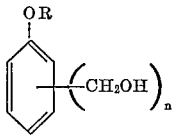

where $n$ is 1 to 3 and R is an unsaturated aliphatic group or a halogenated derivative of such a group. The properties of these coating compositions make them highly useful on appliances such as laundry equipment, particularly as primers.

---

This application is a continuation of application Ser. No. 748,953, filed July 31, 1968, now abandoned.

Various electrodepositable compositions wherein the vehicle resin comprises a vehicle resin which is a mixed partial ester of a resinous polyol containing free carboxyl groups with resinous polyol having a portion of its hydroxyl groups esterified with a fatty acid and at least a portion of the remaining hydroxyl groups esterified with an unsaturated fatty acid alpha, beta-ethylenically unsaturated carboxylic acid anhydride adduct have been utilized in the coatings industry. A number of such interpolymers in electrodepositable compositions which have found wide acceptance in the coatings field are disclosed in application Ser. No. 568,144, filed July 27, 1966, now abandoned. These interpolymers are employed alone, or more usually in combination with other resins and are utilized as clear films or as resinous vehicles for primers, enamels or other thermosetting compositions containing pigments. These compositions provide highly desirable coatings having many desirable properties, including adhesion, chemical resistance and mar resistance.

Although compositions comprising these interpolymers provide coatings having outstanding overall properties which make them highly desirable for many applications, for some uses they have certain disadvantages. For example, when formulated as to provide optimum properties of certain types, they tend to be deficient in other properties. One especially trouble-some property is detergent resistance, which means the ability to withstand hot solutions of detergents without degrading the coating on the substrate. Detergent resistance is an extremely important property in any coating for use on laundry equipment or other appliances.

It has now been found that coating compositions having particularly good properties, including unexpectedly outstanding detergent resistance, are obtained by combining the aforesaid mixed partial esters with a composition consisting essentially of one or more methylolphenol ethers. Such coating compositions provide numerous advantages including, as mentioned, exceptional detergent resistance, as well as improved adhesion to many substrates and better salt spray resistance, and provide these advantages without detracting from other properties.

As previously stated, the mixed partial ester vehicle resins of the compositions of this invention are fully described in copending application Ser. No. 568,144, filed July 27, 1966. Certain of the esters which may be utilized in the composition of this invention are further disclosed in Belgian Pat. No. 641,642. These resins esters comprise mixed esters of a fatty acid and an unsaturated fatty acid adduct with a polyhydroxyl-containing resin.

The resinous polyols which may be utilized in producing the resins of the instant invention may be essentially any resinous polyol having a molecular weight between about 500 and 5000, and preferably having a molecular weight between 1000 and 3000.

The term "resinous polyol" as used herein includes those resinous materials containing oxirane rings which can be opened in, prior to, or during the esterification reaction to provide apparent hydroxyl sites.

The presently preferred class of polyols are epoxy resinous materials such as those obtained by reacting a polyhydric phenol with an epihalohydrin such as epichlorohydrin, epibromohydrin or epiiodohydrin. Among the polyhydric phenols which may be used in preparing these epoxy resinous materials are those compounds represented by the general formula:

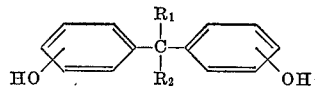

wherein the phenolic hydroxy groups may be in any of the 2,2'; 2,3'; 2,4'; 3,3'; 3,4' or 4,4' positions on the aromatic nuclei, and each of $R_1$ and $R_2$ represent hydrogen, a lower alkyl group, such as methyl, ethyl, propyl, isopropyl, butyl, sec-butyl, tert-butyl, pentyl, isopentyl, hexyl, isohexyl, and the like; a cyclo(lower)alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl and the like, with the total number of carbon atoms in the substituents represented by $R_1$ and $R_2$ not exceeding 14. In addition, the phenolic rings may have other substituents besides the hydroxyl groups, for example, lower alkyl groups containing from 1 to 4 carbon atoms, i.e., methyl, ethyl, propyl, isopropyl, butyl, sec-butyl and tert-butyl groups, or halogen atoms, i.e., fluorine, chlorine, bromine or iodine.

An illustrative but by no means exhaustive listing of polyhydric phenols falling within this general formula includes 4,4'-dihydroxydiphenylmethane;
2,2-bis-4-hydroxyphenylpropane;
2,4-dihydroxydiphenylethylmethane;
3,3'-dihydroxydiphenylethylmethane;
3,4-dihydroxydiphenylmethylpropylmethane;
2,3'-dihydroxydiphenylethylphenylmethane;
4,4'-dihydroxydphenylpropylphenylmethane;
4,4'-dihydroxydiphenylbutylphenylmethane;
2,2'-dihydroxydiphenylditolylmethane;
4,4'-dihydroxydiphenyltolylmethylmethane, and the like. Other polyhydric phenols which may also be co-reacted with an epihalohydrin to provide epoxy resinous materials which may be employed in the practice of the present invention are such compounds as resorcinol, hydroquinone, substituted hydroquinones, e.g., p-tert-butylhydroquinone and the like.

Other epoxy resins, likewise, may be used as the starting polyol, for example, the polyepoxide can be any epoxide compound or mixture which has an epoxy functionality of greater than 1.0, that is, in which the average number of oxirane groups

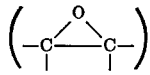

per molecule is greater than 1. The average number of oxirane groups may be a fractional number, and in general is less than 4.0.

Also suitable are polyglycidyl ethers of polyhydric alcohols which may be derived from such aliphatic polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like.

There may also be employed the polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthylene dicarboxylic acid, dimerized linolenic acid, and the like. Examples are diglycidyl adipate and diglycidyl phthalate, and similar esters which correspond to the formula:

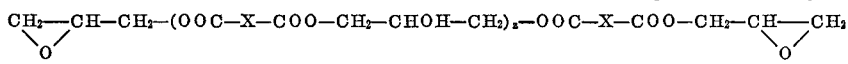

in which X represents a hydrocarbon radical, such as a phenyl or other aromatic radical or an aliphatic radical, and z represents a whole or fractional small number.

There may also be employed polyepoxides derived from the epoxidation of an olefinically unsaturated alicyclic compound. Included are diepoxides and higher epoxides, as well as mixtures of epoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid.

There may also be employed the corresponding diesters of the formula:

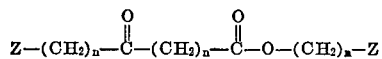

where $n$ is a small whole number, e.g., from 1 to 8, and Z is a radical of the structure:

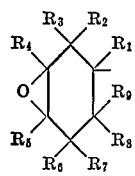

where $R_1$ through $R_9$ are hydrogen or lower alkyl radicals, i.e., having up to 8 carbon atoms. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Another class of resins which may be employed is alkyd resins which are prepared to contain a significant number of free hydroxyl groups. These alkyl resins are well-known in the art and are produced by heating and reacting together a polyhydric alcohol and a polybasic acid. Examples of such acids include phthalic acid or anhydride, isophthalic acid, fumaric acid, maleic acid or maleic anhydride and the like.

The polyhydric alcohol may be, for example, glycerol, neopentyl glycol, tetramethylol cyclohexane, pentaerythritol, trimethylol propane, trimethylol ethane and the like. These may, of course, be modified with varying amounts of glycols such as ethylene glycol and propylene glycol, etc.

Another well-known class of closely related resins are the oil-modified alkyds where, in addition to the polybasic acid and polyol there is co-reacted a glyceride oil such as coconut oil, babussu oil, palm kernal oil, tall oil, tung oil, linseed oil, soybean oil, dehydrated castor oil, cottonseed oil, castor oil, fish oils, and the like.

Yet another polyol which is useful is the product prepared by the homopolymerization of 9-oxatetracyclo-[4.4.1$^{2,5}$0$^{1,6}$0$^{3,10}$]undecan-4-ol. Structurally, the polymer has an aliphatic polycyclic backbone and may be represented by the formula:

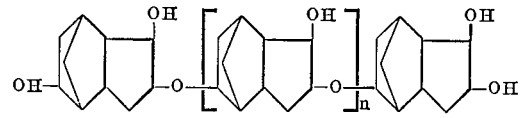

preferably $n=10$–$14$.

Another class of polyfunctional polyols which may be employed in the practice of the present invention encompasses reactive, free hydroxyl-containing polymers obtained by copolymerizing vinyl aromatic monomers such as styrene; side chain-substituted styrenes, and the like; ring-substituted styrenes, such as alkyl styrenes, e.g., ortho-, meta-, and para-alkyl styrenes such as o-methyl styrene, p-ethyl styrene, m-propyl styrene, and the like, dialkyl styrenes, e.g., 2,4-dimethyl styrene, 2,5-diethyl styrene, and the like, halostyrenes, e.g., o-bromo styrene, p-chloro styrene, 2,4-dichloro styrene, and the like, with a hydroxyl-containing vinyl monomer corresponding to the general formula:

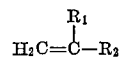

where $R_1$ represents a hydrogen atom, a halogen atom, i.e., fluorine, chlorine, bromine or iodine, or an alkyl group having from 1 to 4 carbon atoms, inclusive, and $R_2$ represents a hydroxyalkyl group, preferably a primary hydroxyalkyl group having from 1 to 4 carbon atoms, inclusive, or the radical:

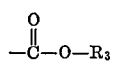

wherein $R_3$ represents a hydroxyalkyl group, preferably a primary hydroxyalkyl group, having from 1 to 4 carbon atoms, inclusive, using conventional vinyl polymerization techniques, e.g., solution or suspension polymerization in the presence of a free radical polymerization catalyst such as benzoyl peroxide, cumene hydroperoxide, and the like.

An illustrative but by no means exhaustive enumeration of hydroxy-containing vinyl monomers coming within the scope of the above general formula includes such compounds as allyl alcohol,
β-bromoallyl alcohol,
β-chloroallyl alcohol,
methallyl alcohol,
3-buten-1-ol,
3-buten-2-ol,
4-penten-1-ol,
4-penten-2-ol,
2-hydroxyethyl acrylate,
2-hydroxyethyl methacrylate, 2-hydroxyethyl-2-ethyl acrylate,
2-hydroxyethyl-2-propylacrylate,
2-hydroxyethyl-2-butylacrylate,
2-hydroxyethyl-2-chloroacrylate,
2-hydroxypropyl acrylate,
3-hydroxypropyl methacrylate,
3-hydroxypropyl-2-propylacrylate,
3-hydroxypropyl-2-butylacrylate,
3-hydroxypropyl-2-bromoacrylate,
4-hydroxybutyl acrylate,
4-hydroxybutyl methacrylate,
3-hydroxybutyl-2-ethylacrylate,
3-hydroxybutyl-2-butyl acrylate,
4-hydroxybutyl-2-butylacrylate,
4-hydroxybutyl-2-chloroacrylate, and the like.

These hydroxy-containing vinyl monomers, as well as methods for their preparation, are well known in the art. Thus, for example, one method of preparation of the above-described hydroxyalkyl acrylates and methacrylates involves reacting the appropriate acrylic acid derivative, or a suitable ester thereof, with an alkane diol. Another method involves the reaction of the appropriate acrylic acid derivative with a lower alkylene oxide, such as ethylene oxide, propylene oxide, and the like.

A typically commercially available polymer of this type has a molecular weight of approximately 1600 and an equivalent weight in the range of 285–315, and may be described as having the repeating structure:

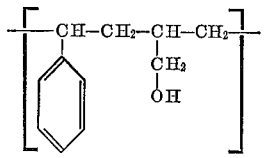

A commercially available polymer having the same repeating structure has an average molecular weight of approximately 1150 and an equivalent weight of approximately 222.

To form the vehicle resins of the instant composition, a portion of the hydroxyl groups of the polyol are reacted with a fatty acid, the ratio of reactants being such that an average of at least one hydroxyl group per mole of polyol remains unreacted. The remaining functionality is then esterified with an alpha, beta-olefinically unsaturated dicarboxylic acid anhydride unsaturated fatty acid adduct, such adduct being derived from the thermal reaction of approximately molar ratios of an alpha,beta-olefinically unsaturated dicarboxylic acid anhydride including maleic anhydride, citraconic anhydride, itaconic anhydride or other lower alkyl-substituted anhydrides, and an unsaturated fatty acid, thereby introducing free acid groups into the molecule.

The fatty acids used to partially esterify the polyol may be saturated or unsaturated, for example, fatty acids obtained from fatty acid glycerides such as linseed fatty acid, soya fatty acids, tall oil fatty acids, coconut oil fatty acids, tung oil fatty acids, fish oil fatty acids, oiticica oil fatty acids, castor oil fatty acids. Likewise, the isolated fatty acids, such as capric, caprylic, lauric, myristic, palmitic, oleic, linoleic, linolenic, eleostearic, clupanodinic, ricinoleic, licanic acids may be employed.

The fatty acids utilized to form the adduct are those which are or can be derived from drying or semi-drying oil fatty acid esters or from such sources as tall oil. Examples of such acids include linseed oil fatty acids, soya oil fatty acid, safflower oil fatty acid, perilla oil fatty acid, poppyseed oil fatty acid, sunflower oil fatty acid, walnut oil fatty acid, herring oil fatty acid, menhaden oil fatty acid, sardine oil fatty acid, and the like, as well as isolated unsaturated fatty acids which may be derived from the above.

The reaction between the polyol and the fatty acid to produce the hydroxyl-containing partial ester is prepared by heating the polyol and fatty acid in the approximate molar proportion desired in the final product under esterification conditions, the water of reaction being removed by the use of solvent such as xylene, toluene or other solvent usually employed in solvent-type alkyd or polyester technology. Alternatively, the partial ester can be formed in the fusion process using an inert gas purge to carry off the water. The temperature employed may vary over a wide range. Preferably, the temperature employed is between 150° C. and 300° C. and, more preferably, between 200° C. and 260° C.

The reaction of the hydroxyl-containing partial ester with the fatty acid adduct is conducted by heating the partial ester with the adduct in equivalent ratios, or less than equivalent ratios if free hydroxyl groups and/or low acid numbers are desired in the final product, i.e., one mole of adduct per remaining hydroxyl group or less. The final acid number of the resin is obviously governed by the amount of adduct reacted. The reaction is conducted at a temperature sufficiently low to cause the hydroxyl group to react with the anhydride ring of the adduct rather than the free carboxyl group of the fatty acid. Usually this is at a temperature below about 180° C. Preferably, the reaction is conducted at a temperature between about 100° C. and about 160° C.

The ratio of the fatty acid groups to the unsaturated fatty acid adduct groups on the polyol may vary considerably, for example, to the extreme where an average of only one fatty acid group or, alternatively, an average of only one unsaturated fatty acid adduct group is reacted with each mole of polyol. Since the preferred vehicle resins of the invention have low acid values, usually at least a majority of the hydroxyl groups of the polyol are reacted with fatty acids; or stated in another manner, preferably only an average of one, two or three hydroxyl groups per molecule are reacted with the unsaturated fatty acid adducts to produce vehicle resins which have an acid value below 100, and preferably below 70, and even more preferably, below 50.

In producing the coating compositions of the instant invention, the above mixed partial ester vehicle resins are combined with a methylol phenol ether composition consisting essentially of one or more methylol phenol ethers of the formula:

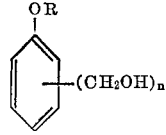

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example, 2-chloroallyl, 3-chloroallyl, 3-chloro-2-methallyl, 1-chloro-2-butenyl, and corresponding groups containing other halogens such as bromine or fluorine.

The methylol phenol ether compositions employed herein are described in U.S. Pat. No. 2,579,330, and as disclosed therein can be produced from sodium or barium salts of 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta positions). The trimethylolated derivative is generally the predominant component of the composition. Such commercially available methylol phenol ether compositions are preferred for use in the invention.

The proportion of the methylol phenol ether composition and the mixed partial ester vehicle in the coating composition can be varied considerably. The optimum amount employed depends upon the particular properties desired in the product, and also depends in part upon the particular mixed partial ester employed. In the preferred products, the methylol ether composition comprises from about 5 to about 20 percent of the total weight of the methylol phenol ether and the mixed partial ester, although as little as one percent gives some degree of improvement in the properties of the composition and as much as 50 percent or even higher can be utilized in some cases.

In order to produce an electrodepositable composition, it is necessary to at least partially neutralize the acid groups present with a base in order to disperse the resin in the electrodeposition bath. Inorganic bases such as metal hydroxides can be used but it is preferred to use ammonia or organic bases, especially water-soluble amines, such as for example, the mono-, di- and tri-lower alkyl amines such as methylamine, ethylamine, propylamine, butylamine, dimethylamine, diethylamine, dipropylamine, dibutylamine and m-methylbutyl amine, triethylamine, tributylamine, methyldiethylamine, dimethylbutylamine and the like; cyclic amines such as morpholine pyrrolidine, piperidine; diamines such as hydrazine, methylhydrazine, 2,3-toluene diamine, ethylene diamine, ethylene diamine, and piperizine and substituted amines such as hydroxylamine, ethanolamine, diethanolamine, butanolamine, hexanolamine, and methyldiethanolamine, octanolamine, diglycol amine and other polyglycol amines, triethanol, and methylethanolamine, n-amino-ethanolamine and methyldiethanolamine and polyamines such as diethylene triamine, triethylene tetramine, hexamethylene tetramine.

It has been found that in order to produce a stable aqueous dispersion of the vehicle resin of the instant invention, it is necessary to employ a bath which has a pH substantially higher than that shown in the prior art. In order to maintain consistent behavior, the pH of the instant compositions should be at least 8.0 and with regards to the preferred species having low acid numbers, the pH is preferably above 8.4. A pH range of about 8.6 to about 9.2, or even higher, is usually employed and it has been found that no deleterious effects are present when operating at a pH as high as 10.0 and even a higher pH apparently may be employed but is unnecessary.

While the dispersed vehicle resins of the invention may be used alone in electrodeposition baths to form clear coatings, it is frequently desirable to incorporate into the compositions other materials, such as coupling solvents, pigments and other adjutants typically found in paint formulations.

In many instances, it is preferred to add to the bath in order to aid dispersibility, viscosity and/or film quality a non-ionic modifier or solvent. Examples of such materials are aliphatic, naphthenic, and aromatic hydrocarbons or mixtures of the same, mono- and dialkyl ethers of glycols, pine oil and other solvents, compatible with the resin system. The presently preferred modifier is 4-methoxy-4-methylpentanone-2 (Pent-Oxone).

The pigment compositions used may be any conventional type comprising for example, iron oxide, lead oxide, strontium chromate, carbon black, titanium dioxide, talc, barium sulfate and the like, as well as combinations of these and similar pigments. Color pigments such as cadmium yellow, cadmium red, phthalocyanine blue, chrome yellow, toluidine red, hydrated iron oxide, and the like, may be included if desired. There is often incorporated into the pigment composition a dispersing or surface active agent. If such a surface active agent is used, it should be the non-ionic or anionic type or a combination of these types. It is desirable to avoid the use of any cationic type agent. Usually the pigment and surface active agent, if any, are ground together in a portion of the vehicle, or alone, to make a paste and this is blended with the vehicle to produce a coating composition.

It has been found especially important to regulate the ratio of pigment to the vehicle in compositions which are used in electrodeposition processes. In most instances the most desirable coatings are obtained when the coating composition contains a ratio of pigment-to-vehicle of not higher than .5 to 1 and preferably not higher than 1 to 1. If the composition has too high a pigment-to-vehicle ratio, the electrodeposited films may exhibit very poor flow characteristics, and in many instances are non-continuous and are therefore, subject to deterioration.

There may also be included in the coating composition, if desired, additives such as antioxidants, for example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines or their amides, esters of sodium isothionates, alkyl phenoxypolyoxyethylene alkanols, or phosphate esters, including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process in operative, these cations may result in variations of properties of the baths when used in electrodeposition. Thus, it is often desirable to use deionized water, i.e., water from which free ions have been removed by the passage through ion exchange resins to make up coating compositions of the instant invention.

In addition to the mixed ester vehicle resin and the phenolic ethers described above, there may be present other resinous materials. The preferred compositions generally contain at least about 50 percent by weight, based on the total resinous materials present, of the mixed ester vehicle resin, although compositions containing less resin may be employed. Other resins may be added along with the phenolic ethers of the invention. The class of materials which may be added, for example, are amine-aldehyde condensation products. The amine-aldehyde products employed herein are aldehyde condensation products of melamine, urea, acetoguanamine or a similar compound and may be water soluble or they may be organic solvent soluble. Generally the aldehyde employed is formaldehyde although useful products can be made from other aldehydes such as acetaldehyde, crotonaldehyde, acrolein, benzaldehyde, furfural and others. Condensation products of melamine or urea are the most common and are preferred, but products of other amines and amides in which at least one amido group is present can be employed.

For example, such condensation products can be produced with triazines, diazines, triazoles, guanadines, guanamines, and alkyl and aryl-substituted derivatives of such compounds, including alkyl-substituted and aryl-substituted cyclic ureas, and alkyl- and aryl-substituted melamines. Examples of such compounds are: N,N'-dimethyl urea, benzyl urea, N,N'-ethylene urea, diazine diamide, formaguanamine, benzoguanamine, ammeline, 2-chloro-4,6-diamino-1,3,5-triazine, 3,5-diaminotriazole, 4,6-diaminopyrrimidine, 2,4,6 - triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

In the electrodeposition process, a process well described in the art, an aqueous bath containing the composition is placed in contact with an electrically conductive anode, and an electrically conductive cathode. The coating is deposited upon the anode so that the metal substrate to be coated is used as the anode. Upon passage of electric current between the anode and the cathode, while in contact with the bath containing the coating composition, an inherent film of the coating composition is deposited on the anode.

The conditions of which the electrodeposition process is carried out are those conventionally used in electrodeposition. The applied voltage may vary greatly and can be as low as, for example, one volt or as high, for example, as 500 volts or higher. It is typically between 50 and 350 volts. The current tends to decrease during electrodeposition and the films become insulative and cause the deposition of film to be self-terminating at any particular voltage.

The anode employed may be any electrically conductive metal, such as iron, steel, aluminum, galvanized steel, phosphatized steel, zinc, and the like.

The concentrations of the coating composition in the aqueous bath used in electrodeposition is not critical and relatively high levels of coating composition can be used. However, it is ordinarily desirable to use a low concentration of coating composition since this is one of the benefits inherent in this system. Baths containing as little as one percent by weight of the coating composition in water can be employed. In general practice, the baths used usually contain between five and about 15 percent by weight of paint solids. Generally it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried, or, usually, it is heated in an oven or by some other appropriate means to bake or dry the film. When this is done, the baking temperatures of about 275° F. to about 450° F. for 60 to 10 minutes are usually employed.

The invention is further described in conjunction with the following examples which are to be considered illustrative rather than limiting. All parts and percentages in the examples and throughout this specification are by weight unless otherwise stated.

EXAMPLE A

A maleinized tall oil fatty acid adduct was prepared by charging into a reaction vessel fitted with agitator, thermometer, inert gas inlet and reflux condenser, 784 parts of maleic anhydride and 2280 parts of tall oil fatty acids. The air in the reactor was displaced with an inert gas blanket and the contents heated to 80° C. to melt the maleic anhydride. The reaction mixture was then agitated and heated slowly to about 225° C. in about 2 hours, then to 260° C. in an additional hour. The reaction was held at 260° C. for an additional three hours. The reaction product had a viscosity of 5000 centipoises, an acid value determined in alcoholic KOH of 255.

EXAMPLE B

In the manner of Example A, 784 parts of maleic anhydride, 2240 parts of linseed fatty acid were heated to 220° C. and held for one hour. The final maleinized linseed oil fatty acids had an acid value of 260.

EXAMPLE C

Into a reactor equipped with an agitator, thermometer, inert gas tube and reflux condenser and water trap was added 32 parts of styrene-allyl alcohol copolymer having the repeating structure:

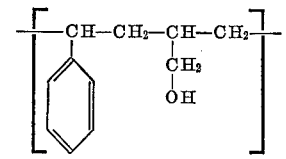

having a molecular weight of approximately 1600 and an equivalent weight in the range of 285 to 312, 21.4 parts of tall oil fatty acid and 1.2 parts of xylene. The reaction mixture was heated with agitation and slowly inert gas sparged at 250° C. and was held until an acid value of approximately 5 was reached. This was approximately 4½ hours after reaching 250° C. The water of reaction was removed by this time. The reaction mixture was then sparged vigorously with inert gas to remove the xylene and cooled to 158° C. There was then added .4 part maleinized adduct of Example A. The reaction mixture was heated to 145° C. and held at that temperature for one hour. The reaction product was then diluted with 6.4 parts of Pent-Oxone. The final product has a viscosity of 58,000 centipoises and an acid value in alcoholic KOH of 32.

EXAMPLE D

Into a reactor equipped with an agitator, thermometer, inert gas tube and reflux condenser and water trap were added 1850 parts of Epon 1004 (the condensation product of epichlorohydrin and Bisphenol A, having an epoxy equivalent of 870 to 1025 and an average molecular weight of 1900), 1425 parts tall oil fatty acids, 35 parts xylene. The reaction mixture was heated with agitation and slow inert gas sparge to 250° C. and held until an acid value of approximately 5 was reached. This was approximately 4½ hours after reaching 250° C. Approximately 60 parts of water were collected. The reaction mixture was then vigorously sparged with inert gas to remove the xylene and cooled to 150° C. There was then added 574.5 parts maleinized adduct of Example A, the reaction mixture was heated to 145° C. and held at that temperature for one hour. The reaction product was then diluted with 420 parts of Pent-Oxone. The final product had a viscosity of 330,000 centipoises and an acid value in alcoholic KOH of 36 at 90 percent solids.

EXAMPLE E

Into a reactor described in Example D were charged 525 parts of an epoxy resin which is the condensation product of epichlorohydrin and Bisphenol A having an epoxy equivalent of 450 and 525 and an average molecular weight of 900 to 1000 (Epon 1001); 560 parts of linseed fatty acid and 25 parts xylene. The reaction mixture was heated with agitation and slow inert gas sparge to 250° C. and held to an acid value of 5, at which point the rate of the inert gas sparge was increased to remove the xylene. The reaction mixture was then cooled to 100° C. and 189 parts of maleinized linseed fatty acid (as in Example B) was added. The reaction mixture was heated to 145° C. and held at that temperature for 45 minutes. The reaction mixture was then cooled to 120° C. and 139 parts of Pent-Oxone added. The final mixture comprised 90 percent solids, had an acid value in alcoholic KOH of 39.8 and a viscosity of 30,000 centipoises.

EXAMPLE F

Into a reactor such as described in Example C were charged 553 parts of a styrene-allyl alcohol copolymer having the repeating structure:

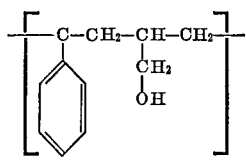

having a molecular weight of approximately 1600 and an equivalent weight in the range of 285 to 315, 350 parts linseed fatty acid, and 20 parts of xylene. With the slow stream of inert gas flowing, the reaction mixture was heated to a temperature of 250° C. and held to an acid value of approximately 5. The inert gas sparge was then increased to remove the xylene and the reaction mixture cooled to 100° C. There was then added 157 parts of maleinized linseed fatty acid of Example B. The reaction mixture was then heated to 145° C. and held for 45 minutes and then cooled to 120° C., at which time 113 parts Pent-Oxone were added to the mixture. The above composition comprised approximately 90 percent solids with a viscosity of 210,000 centipoises and an acid value of 46.8.

EXAMPLE G

Into a reactor such as described in Example C were charged 694 parts of Epon 1004 (the condensation product of epichlorohydrin and Bisphenol A, having an epoxy equivalent of 870 and 1025 and an average molecular weight of 900 to 1000), 1470 parts of linseed fatty acids and 90 parts of xylene. The reaction mixture was heated with agitation and slow inert gas sparge to 260° C. and held until an acid value of approximately 5 was reached. Approximately 60 parts of water were collected. The reaction mixture was then vigorously sparged with inert gas stream to remove the xylene and cooled to 100° C. There was then added 574.5 parts of the maleinized adduct of Example A. The reaction mixture was heated, then diluted with 386 parts of Pent-Oxone. The final product had a viscosity of 66,000 centipoises and an acid value in alcoholic KOH of 40.7 at 90.4 percent solids.

EXAMPLE H

A pigment paste was made as follows:

| | Parts by weight |
|---|---|
| Deionized water | 38.59 |
| Dispersing agent (a nonylphenol poly(ethyleneoxy) phosphate ester) | 2.53 |

The above was mixed and there was added:

| | Parts by weight |
|---|---|
| Strontium chromate | 4.38 |
| Aluminum silicate | 35.06 |
| $TiO_2$ | 48.12 |
| Carbon black | 0.38 |
| Red iron oxide | 1.68 |

The above was sand milled to a 7.5 Hegman grind and washed out with 44 parts deionized water. This was designated Paste A.

There was separately mixed:

| | |
|---|---|
| Isophorone | 15.00 |
| Pent-Oxone | 29.00 |
| Benzoguanamine-formaldehyde resin * | 68.40 |

*100 percent solids; Gardner-Holt viscosity at 25° C. T–Y (measured in 65 percent solids in mixture of 1.3 parts butanol and 2.0 parts xylene, specific gravity 1.10; minimum melting point 60° C. (QR–336).

This mixture was blended in a Cowles mill until dissolved and washed out with 10 parts of Pent-Oxone. This was designated Paste B.

Paste B was added to a blending tank and there was added 40.5 parts of a mixture of allyl ether of mono-, di- and trimethylol phenols with the trimethylol derivative predominating (Methylon 75108), having the following properties:

| | | |
|---|---|---|
| Solids content | percent | 100 |
| Viscosity (25° C.) | centipoises | 2000–4000 |
| Pounds per gallon | | 10 |
| Percent reactive | | 99 |

After thorough mixing there was then added a mixture of:

| | Parts by weight |
|---|---|
| Vehicle resin (as in Example C) | 180.00 |
| Cresylic acid | 2.30 |

After thorough mixing there was added 174.7 parts of Paste A above. After complete mixing there was added 14.0 parts of dimethylethanolamine. Again, after complete mixing, there was incrementally added very slowly 366 parts of deionized water.

The above composition was then reduced to 10 percent solids (pH 9.2) and charged into an electrodeposition tank. A Ca-Zn phosphate coated steel panel was electrocoated from this bath at 100–250 volts for one minute (0.8 mils) and baked 20 minutes at 400° F. The above panel, as well as a panel similarly prepared from the same electro-depositable composition without the phenol ether, were evaluated by a commercially-used detergent resistance test involving exposure to a 1½ percent detergent solution in distilled water at 165° F.

The panel coated in accordance with the present invention had no blistering after 500 hours and was considered to satisfactorily pass the test for this period, whereas the comparison panel (without methylolphenol ether) began to blister after 100 hours and failed completely at 150 hours.

In this and other tests, it has been shown that incorporation of methylolphenol ethers in coating compositions based upon the polyol-mixed ester vehicle resins, as described, not only invariably greatly increases the detergent resistance of the resulting coatings, but also provides coatings having the basic highly desirable quality of the mixed partial ester vehicle resins as known heretofore. Good results are obtained not only with compositions as specifically exemplified, but with other compositions employed, for instance, other methylolphenol ethers of the class disclosed, as well as other vehicle resins such as those of D, E, R and G herein.

According to the provisions of the patent statutes, there are described above the invention and what are now considered to be its best embodiments. However, within the scope of the appended claims, it is to be understood that the invention can be practiced otherwise than as specifically described.

We claim:

1. In the process for electrodeposition of a coating upon an electrically-conductive article serving as an anode in a bath comprising an aqueous medium containing a solubilized synthetic carboxylic acid resin in contact with both the anode to be coated and a cathode, by passage of electric current between the anode and the cathode, the improvement which comprises employing as the bath an aqueous dispersion comprising:

(A) a vehicle resin which is a mixed partial ester of a resinous polyol, containing free carboxyl groups, said resinous polyol having a molecular weight between about 500 and about 5000, said polyol having a portion of its hydroxyl groups esterified with a fatty acid and at least a portion of the remaining hydroxyl groups esterified with an unsaturated fatty acid-alpha,beta-ethylenically unsaturated carboxylic acid anhydride adduct, said adduct forming the ester through the anhydride ring of said adduct, and (B) from about 1 to about 50 percent, based on the total weight of (A) and (B) herein, of a methylol phenol ether composition consisting essentially of one or more methylol phenol ethers of the formula:

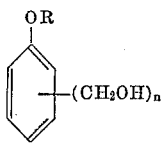

where *n* is an integer from 1 to 3 and R is an unsaturated aliphatic group or a halogen-substituted unsaturated aliphatic group, (C) said aqueous dispersion containing sufficient base to maintain said vehicle resin in dispersion.

2. A method as in claim 1 wherein the resinous polyol has a molecular weight between about 1000 and about 3000.

3. A method as in claim 1 wherein the mixed partial ester has an acid value below about 50 and the bath has a pH above about 8.4.

4. A method as in claim 2 wherein the polyol is selected from the group consisting of:

(A) an epoxy resin which is the reaction product of a polyhydric phenol corresponding to the formula:

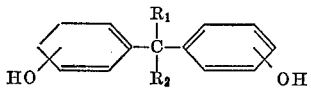

where $R_1$ and $R_2$ are selected from the group consisting of hydrogen and lower alkyl and an epihalohydrin, and (B) a styrene-allyl alcohol copolymer having the repeating structure:

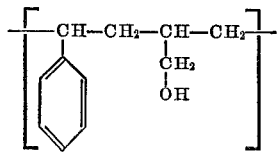

5. A method as in claim 4 wherein the fatty acid and the unsaturated fatty acid are selected from the group consisting of linseed oil fatty acids and tall oil fatty acids.

6. A method as in claim 1 wherein said methylol phenol ether composition consists essentially of a mixture of allyl ethers of mono-, di- and trimethylol phenols.

7. A method as in claim 1 wherein the bath contains an organic solvent compatible with the bath composition.

References Cited

UNITED STATES PATENTS

| | | | |
|---|---|---|---|
| 2,579,329 | 12/1951 | Martin | 260—613 |
| 2,579,330 | 12/1951 | Martin | 260—613 |
| 2,961,384 | 11/1960 | McKinney et al. | 204—14 |
| 3,230,162 | 1/1966 | Gilchrist | 204—181 |
| 3,304,250 | 2/1967 | Gilchrist | 204—181 |
| 3,366,563 | 1/1968 | Hart et al. | 204—181 |
| 3,369,983 | 2/1968 | Hart et al. | 204—181 |
| 3,428,586 | 2/1969 | Coats | 260—22 |
| 3,441,489 | 4/1969 | Gacesa | 204—181 |
| 3,449,228 | 6/1969 | Yurchesen | 204—181 |
| 3,493,483 | 2/1970 | Gacesa | 204—181 |
| 3,494,847 | 2/1970 | Yurchesen | 204—181 |
| 3,536,640 | 10/1970 | Kapalko et al. | 204—181 |
| 3,537,969 | 11/1970 | Jerabek et al. | 204—181 |

PATRICK P. GARVIN, Primary Examiner

P. E. KONOPKA, Assistant Examiner

U.S. Cl. X.R.

260—22 R, 22 EP, 29.2 E, 29.6 AT, 29.7 H, 29.7 T, 29.7 AT, 32.4, 32.6 R